United States Patent

Strand

[19]

[11] Patent Number: 6,151,317
[45] Date of Patent: Nov. 21, 2000

[54] CONTROL TYPE OR SERVICE INDEPENDENT BUILDING BLOCK

[75] Inventor: Jan Strand, Karlstad, Sweden

[73] Assignee: Telefonaktiebolaget LM Ericsson, Stockholm, Sweden

[21] Appl. No.: 09/056,878

[22] Filed: Apr. 8, 1998

[30] Foreign Application Priority Data

Apr. 9, 1997 [SE] Sweden .................................. 9701320

[51] Int. Cl.$^7$ .................................................. H04L 12/50
[52] U.S. Cl. ........................... 370/385; 370/522; 379/229
[58] Field of Search .................................. 379/207, 229, 379/230, 201; 370/357, 385, 522, 524

[56] References Cited

U.S. PATENT DOCUMENTS

| | | | |
|---|---|---|---|
| 4,782,517 | 11/1988 | Bernardis et al. . | |
| 5,528,677 | 6/1996 | Butler et al. . | |
| 5,703,940 | 12/1997 | Sattar et al. | 379/201 |
| 5,761,290 | 6/1998 | Farris et al. | 379/207 |
| 5,838,768 | 11/1998 | Sumar et al. | 379/89 |
| 5,864,614 | 1/1999 | Farris et al. | 379/207 |
| 5,970,385 | 10/1999 | Pykalisto | 455/2 |
| 5,978,672 | 11/1999 | Hartmaier et al. | 455/413 |

FOREIGN PATENT DOCUMENTS

92/11603  7/1992  WIPO .

*Primary Examiner*—Douglas W. Olms
*Assistant Examiner*—Ken Vanderpuye
*Attorney, Agent, or Firm*—Burns, Doane, Swecker & Mathis, L.L.P.

[57] ABSTRACT

An intelligent network includes service switching points, where the call switching is made and where data relating to calls and signals indicating various events relating to the calls are generated Service control points are connected to the service switching points. A service control point includes a service control function for processing events relating to calls. The service function includes predefined building blocks or control types, which are executed for specific events relating to a call. In order to provide an interface to the exterior allowing some customer design or customer programming, in particular to servers including some service finction which is supplied by the customer running the server, the servers are connected to the network only at a single service control point. The service control function in this service control point includes therefor a remote procedure building block, which transfers, when it is executed for an event relating to call, data relating to the call to a data buffer. The function in the server accesses the data buffer through a remote procedure function to process the data and store the data in another data buffer. The remote procedure building block then accesses this data buffer and makes the processed data available to other building blocks as call data.

2 Claims, 3 Drawing Sheets

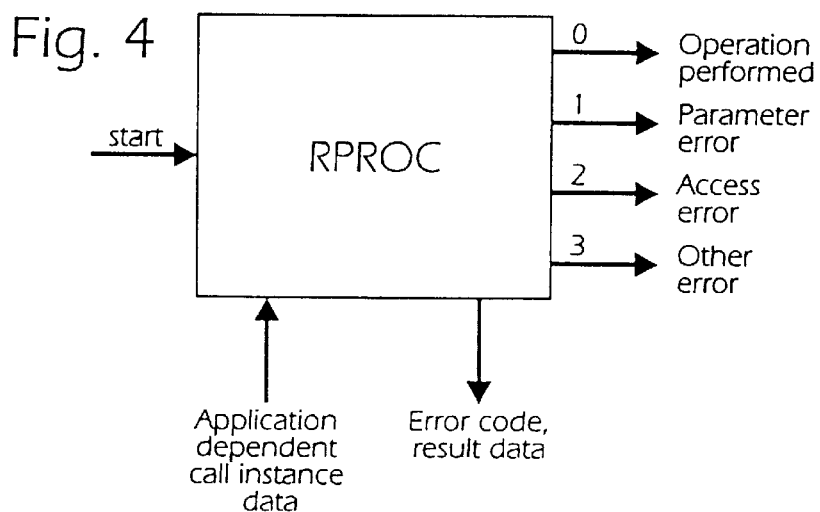

CONTROL TYPE OR SERVICE INDEPENDENT BUILDING BLOCK

The present invention relates to control types or service independent building blocks, SIBs, in the field of intelligent networks.

BACKGROUND

The concept of intelligent networks in the field of telecommunication, as defined in various standards and other documents, comprises as an essential element the separation of the pure switching operations and services associated with a telephone call.

The intelligent network concept allows:

a telecom operator to design its own, unique services or to adapt existing services to specific customer requirements;

that new services are installed requiring an access of only a few control nodes;

centralised administration of services and thus improving response times and decreasing the human resource overhead required to run the network;

customer control of some customer-specific data.

SUMMARY

It is an object of the present invention to provide a service control point in an intelligent network having an interface to the exterior allowing some customer design or customer programming.

It is a further object of the invention to provide a control type or service independent building block to be used in a service control function in a service control point in an intelligent network and allowing the service control function to communicate with external servers for modifying some data used in switching and switching handling operations.

It is yet another object of the invention to provide an interface to the exterior in an intelligent network that allows some modification of telephone call data and that is robust, i.e. operates basically as a firewall.

The problem solved by the invention is thus how to provide, in an intelligent network, an interface to the exterior that allows some customer design or customer programming and that is sufficiently safe so that always the basic functions of the network are preserved, even for erroneous customer programming.

By introducing a customizable control type or customizable service independent building block in a service control function in an intelligent network, the service designers can make their own limited extensions of the functionality already existing in the service control function, without requiring a new design of reprogramming of the service control function and the service management function controlling it and the service data function associated with the considered service control function.

The interface provided by such a customizable control type or service independent building block enables the service designer to invoke a function designed by her/him that can perform manipulations of call data processed in the service control point. The function which can also be regarded as an algorithm is thus designed and managed by the service provider. It is executed in its own environment or its own server that is separate from the service control point, to which it is connected. The robustness of the functions executed in the service control point are thus not jeopardized by errors that can possibly be introduced by the service designer in the provided algorithm.

The interface between the service function in a service control point and an external function should be specified in a manner independent of the specific implementation. The customer supplied function must be capable of being executed on an arbitrary platform. It means that data transported through the interface must be encoded in such a way that they are not interpreted differently depending on the actual platform used.

The basic idea of the customizable control type is thus to allow the service provider to extend the functionality normally existing in a service control function. The service provider is given a possibility to call an own defined function, e.g. a function that reads and adds some data stored externally or performs a specific algorithm. The service provider is thus allowed to change existing call data or add new data.

When the customizable control type is entered into the logic of the service control function, specified portions of call related data, which are stored in the service control point where the considered service control function resides or is executed, are sent to the function designed and maintained by the service provider. After the function has been executed in its own server, the resulting data are sent back to the service control point and there the received data are stored in the call record.

Additional objects and advantages of the invention will be set forth in the description which follows, and in part will be obvious from the description, or may be learned by practice of the invention. The objects and advantages of the invention may be realized and obtained by means of the methods, processes, instrumentalities and combinations particularly pointed out in the appended claims.

BRIEF DESCRIPTION OF THE DRAWINGS

While the novel features of the invention are set forth with particularly in the appended claims, a complete understanding of the invention, both as to organization and content, and of the above and other features thereof may be gained from and the invention will be better appreciated from a consideration of the following detailed description of non-limiting embodiments presented hereinbelow with reference to the accompanying drawings, in which:

FIG. 3 is a representation of the structure of a data module used by a customizable control type, FIG. 4 is a graphical picture of the customizable control type and FIG. 5 is a picture showing a configuration file used to set the processes and the internal and external connections up used in the implementation of the customizable control type.

DETAILED DESCRIPTION

Figure 1:
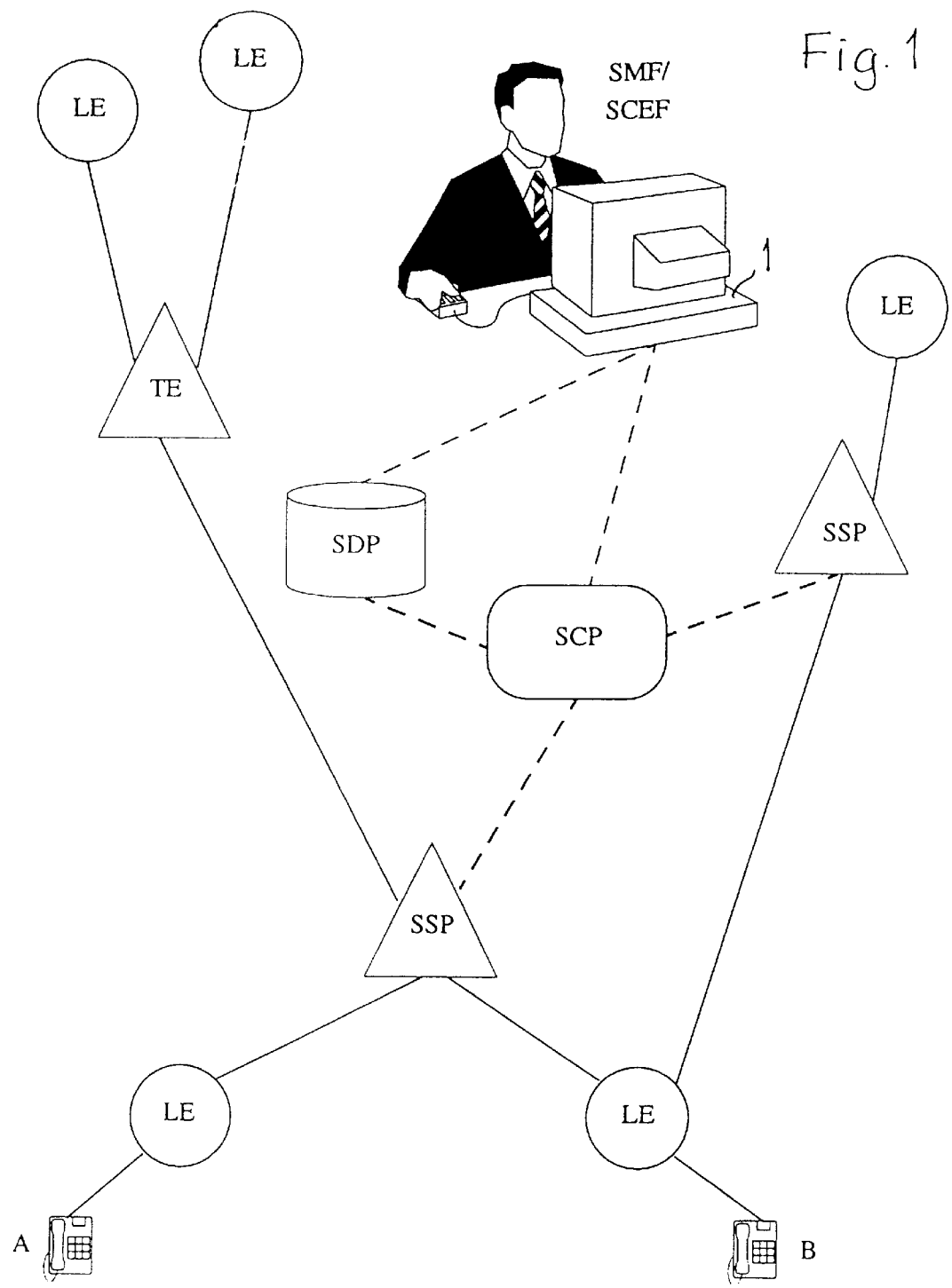
FIG. 1 is a block diagram of a simple intelligent network.

An intelligent network is illustrated in FIG. 1. The components thereof are briefly described below.

A and B are ordinary telephone sets but can also be e.g. modems of computers communicating over the network. LE are local exchanges and TE is a transit exchange. Between the exchanges service switching points, SSPs, may be arranged, which perform the actual switching of telephone and other calls. Each service switching point is associated with and controlled by a service control point, SCP. A single service control point can be associated with several service switching points. A service control point can have access to a service data point, SDP. An administrator can have access to a service control point and its associated service data point through a computer 1 connected to these points.

The lines drawn in full lines can carry speech or voice communication and the dotted lines can only carry non-speech communication.

In the physical "service points" as listed above, one or more service functions can be executed. In a service switching point the functions comprise a service switching function, SSF, and a call control function, CCF. A call control function CCF handles calls and connections to be made or finished in the traditional sense. It is the normal call handling and supervising function of an exchange. It is not a part of the intelligent network itself but provides the intelligent network with information on calls and executes orders as forwarded from the service switching function in the same service switching point.

A service control point is associated with a service control function SCF. A service control function contains the logic steps of a service, i.e. is essentially the base program being executed for actually making the service. It has a complete responsibility for making decisions related to a call. The service switching function SSF in a SSP is an interface between a service switching function SCF in a SCP connected to this SSP and the CCF in the same SSP as the considered SSF and thus forwards call event information such as on-hook or subscriber busy to the SCF and commands to be executed to the CCF from the SCF.

A service data function SDF is comprised within a service data point SDP and handles real time access to data bases comprising data relating to the network and to calls. It thus functions as an interface between a service control function SCF and the data bases.

A service resource function or specialized resource function SRF provides a pool of interactive resources for access from other network entities, i.e. resources to be used in the intelligent network services. It comprises for example blocks for DTMF-digit reception, announcements, speech recognition. It can be incorporated in an SSF but also in an SCF.

A service management function SMF handles the design and administration of nodes and the services therein. This includes adding or removing data, installing or modifying services, etc. It can be run from a computer connected to an SCP and the SCF therein and also to SDPs for accessing network data. The node where it is incorporated may be called a service management point SMP.

An intelligent network service in an SCF is designed as a combination of a number of predefined control types or service independent blocks, SIBs. All services that can be built are thus limited to the functions which can be obtained by combining these predefined SIBs. The service is defined in a service script listing the control types involved and in particular the involved logic modules and their connections to various data modules.

Another control type or SIB which can be introduced in an intelligent network and which is to be described hereinafter allows the service provider to extend the conventional functionality of service control functions SCFs beyond those comprising only combinations of predefined blocks. This control type or SIB is called a remote procedure control type RPROC and is used for communicating with and activating a remote procedure function RPF connected to an SCF located in the same SCP. The control type RPROC thus has a logic module and particular data modules associated therewith. The remote procedure function RPF handles only the communication with an external server CSP, where a customer supplied function CSF designed by the service designer can execute other functions. Such functions CSFs can be designed and modified without changing the SCF and the SMF.

Figure 2:
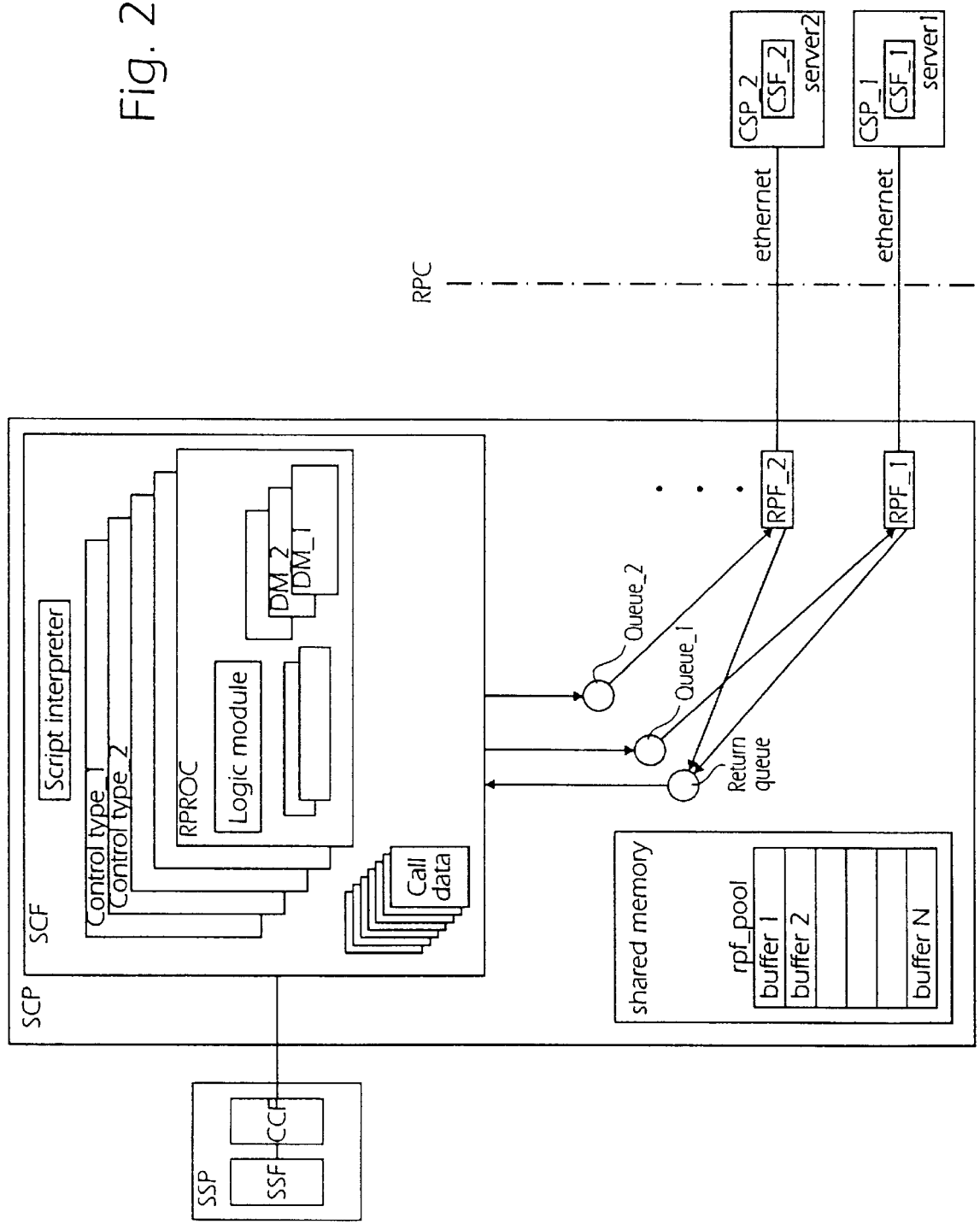
FIG. 2 is a block diagram illustrating the structure of a service control point having facilities for executing customizable services.

In FIG. 2 the general structure of the components needed for such a customizable function is illustrated. An SCF is incorporated in e.g. a general purpose computer SCP where also a plurality of remote procedure functions RPFs: RPF__1, RPF__2, . . . are included. Each RPF communicates individually with the SCF through a special protocol or internal interface. Also, each RPF communicates with an individual customizable service function CSF: CSF__1, CSF__2, . . . respectively included in an external server or customer service point CSP: CSP__1, CSP__2, . . . The CSPs may be separate computers or one or more of the CSPs may be the same computer, such a computer then holding a plurality of customizable service functions. The protocol or interface for the external communication is made through a remote procedure called an RPC interface. The low-level communication protocol can be the Ethernet type. The SCP and the connected CSPs can all be conventional, general purpose computers operating according to a suitable operating system such as UNIX.

The control type RPROC is processed by the control type logic being executed in the SCF and in the case where it is written in some special language, by a service script interpreter program included therein, and otherwise directly by the processor of the SCP. The remote procedure control type RPROC is associated with a logic module and a plurality of data modules, at least one data module DM__1, DM__2, . . . for each remote procedure function RPF__1, RPF__2, . . . included in the considered SCP.

When a signal has been received by the SCF that a call is requested to be started or a signal indicating some other event the interpreter program is started executing some program routine coupled to the specific event and in particular checking whether there are some services which have to be executed for this event. If such a service, as specified in the service script associated therewith, also involves the control type RPROC, it will process this control type RPROC in the sequential order defined in the service script executing the logic as given by the logic module using data from one or more data modules, these also being specified in the service script. In the execution, call parameters as specified in the control type RPROC in a specific one of the data modules DM__1, DM__2, . . . therein which is specified in the service script are retrieved from memory fields in the tag buffer holding call data relating to the event and are placed in a buffer. The parameters of the buffer are sent to the respective one of the RPFs corresponding to the data module DM__1, DM__2, . . . used, e.g. this RPF being defined in this data module. This RPF thus handles in the SCP the customer supplied function which belongs to the external service to be executed for the event. Then the parameters of the object are sent by this RPF to its associated CSF.

The CSF processes the received data and can then change one or more received parameters and it can also create new parameters. After the customer supplied function has finished processing the parameters, the result parameters are placed in buffer. The parameters of the buffer are then returned to the SCP and received by the RPF associated with the CSF, which has made the processing. The RPF in turn sends the parameters of the buffer to the SCF, which in the execution of the logic of the logic module of RPROC receives them and extracts or unpacks the parameters of the buffer and uses them where required in the further processing of the call, as specified in the data module DM_1, DM_2, . . . used, then storing them at specified locations in the call data field belonging to the event starting the service.

The general design of the control type RPROC is illustrated in FIG. 4. It has four outlets:

0 Operation performed with success

1 Parameter error, i.e. a mandatory parameter was missing in the tag buffer

2 Access error, i.e. it was not possible to connect to the external server or a mandatory return parameter was missing 3 Other error The arrow associated with the legend "Error codes, result codes" signifies output from the control type used only internally in the SCF.

The main tasks of the logic functions included in a RPROC are:

1. To prepare the data buffer for access by the RPF. It is made according to the contents of a data module DM owned by the considered RPROC. The DM contains information on the data to be fetched from the tag buffer, as will be described below. If some mandatory data is not present in the tag buffer, error outlet 1 is chosen. The parameters stored in the tag buffer are identified by call tags. A call tag is translated to parameters KOx_ID and KOx-type, see FIG. 3, by a support program.

2. To send the data buffer to the correct RPF using the queue thereof and wait for a reply. The queue can be full and then outlet 2 is chosen.

3. Unpack the returned data received from the common return queue and store them in the correct fields of the tag buffer. If some received parameter is marked mandatory in the corresponding DM field and is missing in the received data buffer, outlet 2 is chosen. Otherwise, outlet 0 is chosen if outlet 2 has not been chosen.

The control type RPROC uses a data module for specifying the input parameters and output parameters of the customer specified function. The data module is principally organized as is illustrated in FIG. 3. In a practical embodiment is it e.g. possible, as determined in a configuration setup, to specify up to 48 input parameters and up to 48 output parameters. Each one of the thus up to 48 rows of the data module contains the following items or columns:

a. Parameter number, for customer use. This is an identifier which is administered by the designer of the customer supplied function.

b. Direction, indicates whether the parameter is to be sent or received. SEND means from the service control point to the customer supplied function and RECEIVE from the customer supplied function to the service control point.

c. Mandatory, indicates whether the parameter is mandatory. TRUE means that the parameter is mandatory, i.e. that it must have a value, and FALSE means that the parameter is optional.

d. Type, indicates the data type of the parameter of the row. KOL or Kind Of Long indicates a 32 integer, KON or Kind Of Number indicates a decimal number, KOS or Kind Of String indicates an alphanumeric string of up to 128 characters, KOV or Kind of Variable indicates a 16 bit integer. Of course, if required or used in the SCP, other parameter types can be defined.

e. KOx_ID. The value of the field Type together with this value indicates a parameter in the call record.

A data module DM_1, DM_2, . . . also contains an identification ID that associates the data module with a specific customer supplied function and thus with a specific RPF. The ID refers to an entry in a configuration file for the control type RPROC. The configuration file is designed and maintained by the service designer of the corresponding customer supplied function. The configuration file of the RPROC can have a layout as illustrated in FIG. 5. Thus it generally has a number of rows, where the field ID contains an identifier of a customer supplied function. Also, information is provided in each row that is used when the RPC handle is created by an RPF towards the server or CSP, where the customer supplied function is running. In the field hostname there can thus be specified the server where the CSF resides since different CSFs can reside in the same external server. In the fields program number and version number the program to be run in the external server and its version are identified. In the field Queue ID there is some identifier of the RPFI queue to which the data buffer belonging to this CSF is to be sent.

An interface called RPFI between the service control function and a RPF is used by the SCF in sending a data buffer to the RPFs. The data buffer is a storage field allocated in a memory pool in a memory in the SCP shared by the SCF and the RPFs, see FIG. 2, the allocation being made when executing the logic of RPROC. The data buffer contains the input data for customer supplied function associated with the considered RPF and these data have thus been prepared, packed and stored there by the logic executing in RPROC. The same interface is also used for holding the result obtained in the execution of a customer supplied function CSF_1, CSF_2, . . . Then the contents of the data buffer are modified or new parameters and are written to the tag buffer in executing the logic of RPROC.

The interface RPFI is implemented as queue connections, one queue connection Queue_1, Queue_2, . . . being used for each RPF_1, RPF_2, . . . for sending to a customer supplied function and only one queue connection, and a single return queue, in the opposite direction for receiving processed data from all the customer supplied functions associated with the considered SCF. When a new data buffer has been prepared by executing the logic of RPROC and stored in the shared memory, a message containing an identification of the CSF and a pointer to the stored data is sent from the SCF to the respective RPF, this message then being transferred to the respective queue Queue_1, Queue_2, . . . In the opposite direction, when processed data have been received from the external server by an RPF and stored in a buffer, the RPF sends a message to the SCF containing an identification of the actual CSF, which has processed the data, and a pointer to the data buffer created by the RPF and holding the processed data in the required format, this message then being placed in the return queue.

The structure of an RPF is specified in a configuration file specific to the RPF. The configuration file can be edited from a terminal connected to the considered SCP. The main tasks of a RPF are:

1. To maintain an RPC handle towards its associated server or CSP, where the customer supplied function resides. An RPF can be created in run-time.

2. To relay the data parameters to the correct customer supplied function when receiving a message containing a pointer to the data. The RPF performs nothing until a reply is received from the CSP. A time-out period is used for awaiting a reply.

3. To receive the data from the customer supplied function.
4. To return the data to the SCF, where the control type RPROC is executed.
5. To wait for the next data buffer from the SCF.

The interface RPC between an RPF and the respective CSF is used for transporting data to and from the CSF.

The main tasks of an CSF are:
1. To receive data from its associated RPF.
2. Unpack the received data and process them.
3. Return the result after processing to the RPF.

While specific embodiments of the invention have been illustrated and described herein, it is realized that numerous additional advantages, modifications and changes will readily occur to those skilled in the art. Therefore, the invention in its broader aspects is not limited to the specific details, representative devices and illustrated examples shown and described herein. Accordingly, various modifications may be made without departing from the spirit or scope of the general inventive concept as defined by the appended claims and their equivalents. It is therefore to be understood that the appended claims are intended to cover all such modifications and changes as fall within a true spirit and scope of the invention.

What is claimed is:

1. An intelligent network having one or more network components, the intelligent network comprising:

switching points, in which the actual switching of calls is made and in which data relating to calls and event signals indicating various events relating to the calls, including setup, establishment and end of calls, are generated;

service points associated with the one or more network components, the service points connected to the switching points for receiving data relating to calls and event signals and for controlling switching points, each service point comprising a service function for processing events relating to calls, for which input data are obtained from the switching points, each service function comprising predefined building blocks, which are executed for specific events relating to a call;

a server comprising a function, the server being connected to the one or more network components only at a service point;

the service function in the service point comprising a remote procedure building block, the remote procedure building block, when it is executed for an event relating to a call, being arranged to transfer data relating to the call to a first data buffer;

the function in the server being arranged to access the data buffer, to process the data and store the data in a second data buffer;

the remote procedure building block being arranged to access the second data buffer and make the processed data available to other building blocks as call data used in the respective processing therein.

2. The network of claim 1, comprising a remote procedure function in the service point comprising the service function holding the remote procedure building block, the remote procedure function being arranged to act as an intermediate function between the service function and the function in the server, the remote procedure function thus accessing the first data buffer for forwarding the data therein to the function in the server and for receiving processed data from the function in the server for storing them in the second data buffer.

* * * * *